July 9, 1968 M. H. WILLEM 3,392,230
INSULATOR AND METHOD FOR MAKING SAME USING ELECTROSTATICALLY
APPLIED DIELECTRIC FIBERS AS SPACER PADS AND GASKETS
Filed May 11, 1966 4 Sheets-Sheet 1

INVENTOR
Michel H. Willem

BY Bauer & Seymour
ATTORNEYS

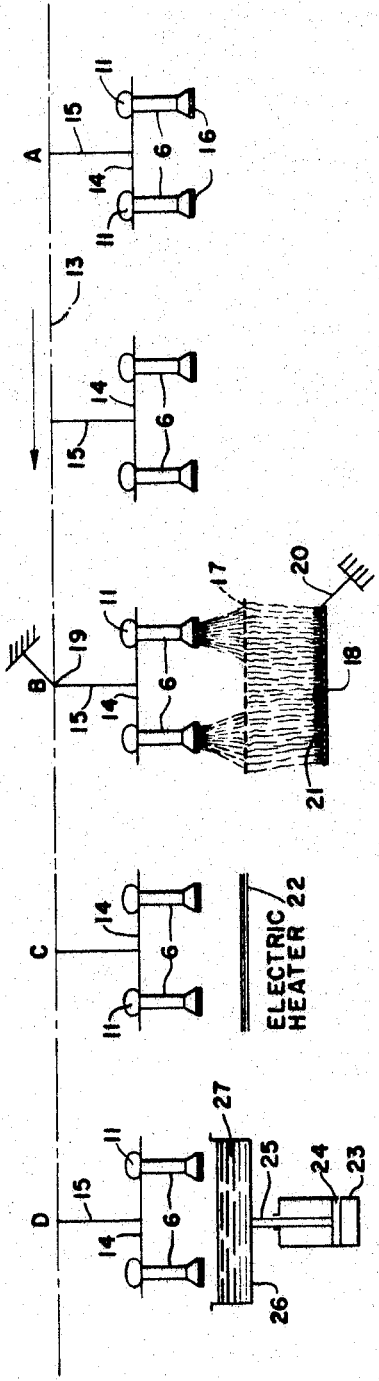
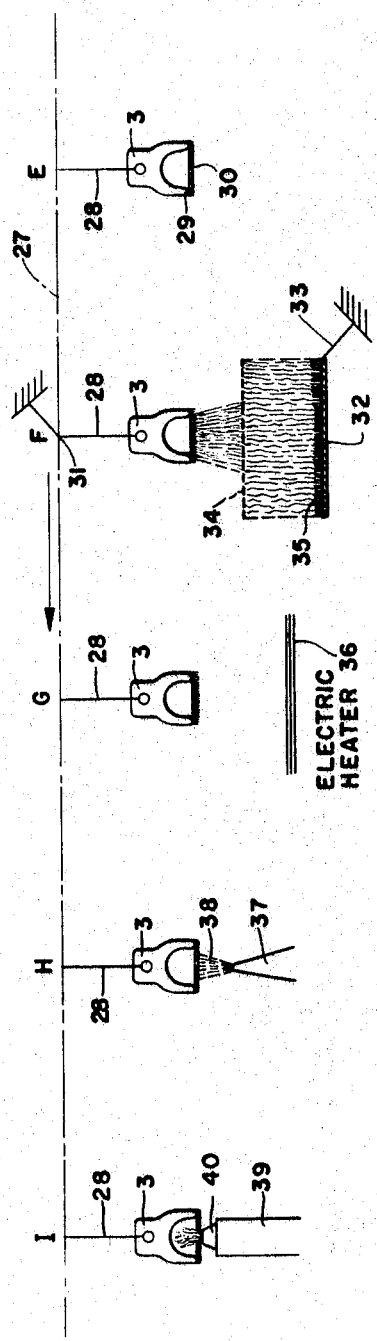
FIG. 2.
FIG. 3.
INVENTOR
Michel H. Willem
BY *Bauer & Seymour*
ATTORNEYS INVENTOR
Michel H. Willem July 9, 1968 M. H. WILLEM 3,392,230
INSULATOR AND METHOD FOR MAKING SAME USING ELECTROSTATICALLY
APPLIED DIELECTRIC FIBERS AS SPACER PADS AND GASKETS
Filed May 11, 1966 4 Sheets-Sheet 4

INVENTOR
Michel H. Willem

BY Bauer & Seymour
ATTORNEYS

United States Patent Office 3,392,230
Patented July 9, 1968

3,392,230
INSULATOR AND METHOD FOR MAKING SAME USING ELECTROSTATICALLY APPLIED DIELECTRIC FIBERS AS SPACER PADS AND GASKETS
Michel H. Willem, Allier, France, assignor to Societe Europeenne d'Isolateurs en Verre (SEDIVER), Paris, France
Filed May 11, 1966, Ser. No. 549,203
Claims priority, application France, May 17, 1965, 17,277
7 Claims. (Cl. 174—182)

ABSTRACT OF THE DISCLOSURE

Electrical insulator and method of assembly, by which pads and gaskets between the interfaces of the cap, stem, and insulator member, are formed in situ by the electrostatic deposition onto one adhesive-coated interface, of flock consisting of fibers of glass or mica, followed by drying of the adhesive and assembly of the parts into interfitting relation, and securement by cement filling the interspaces between them.

---

This invention relates to a method of production of electrical line insulators especially those intended for high-voltage transmission line use, to the insulator per se, and to mechanism for carrying out the method.

Such insulators are used in chain-like series connected in end-to-end relation and suspended from towers. For example, the upper insulator or unit is connected at the distal end of an arm fixed atop the tower, while the lower unit has the transmission line attached thereto. The number of units connected in series may vary, for example, in accordance with the voltage the line is designed to carry.

The insulating part of each unit is formed of a tubular shell of high resistance dielectric material, such as ceramic, having one end closed and provided with an integral skirt portion flaring outwardly from its open end. A metal cap fits down loosely over and about the closed end of the shell or cylinder and is secured thereto by mortar, cement or plastic adhesive filling the interspace between them.

Experience has shown that for proper sealing or connection between the parts, the cement should be vibrated to assure proper compacting and setting thereof. This makes it desirable to avoid direct contact between the dielectric shell and the metal of the cap and stem, not only to avoid affecting the quality of the seal or connection, but also to avoid deleterious effect upon the electrical resistance of the insulating material due to mechanical or thermal shock, and for other reasons.

Prior to uniting the parts by cement, into a unitary structure, it is customary to apply gaskets or pads of cork, pressed cardboard, asbestos, or like material, between the interfaces of the insulator cylinder and exterior surface of the base of the insulator cylinder, and also between the interfaces of the insulator cylinder and stem. These pads serve to maintain the interfaces out of direct contact. It is also customary to secure a rubber ring to the rim portion of the cap, to maintain it out of direct contact with the skirt of the insulator at the location where it merges into the cylindrical portion thereof. This ring is removed after the cement has set. The pads, gaskets, or rings just mentioned are usually secured in place by an adhesive pending complete assembly of the parts into a rigid unitary structure. But while this procedure is theoretically simple and easy, it has serious drawbacks in actual practice. The centering of each gasket or pad with respect to the part to which it is to be adhesively secured, is usually done manually and by eye, so that exact collocation between the gasket and part to which it is to be attached is not practically possible. Furthermore, it frequently happens that before the adhesive has set, the gasket will slip or become displaced from its desired central position on and with respect to its part, thus aggravating improper emplacement.

If the gasket is thus eccentrically located at the time the adhesive hardens, part of the gasket is offset over the edge of the plane surface to which was supposed to be attached; and this induces or promotes an eccentric or non-coaxial relation between the parts and results in an improperly assembled unit. At the diametrically opposite area the interfaces are exposed and may come into direct contact and thus defeat the purpose of the gasket. It may also happen that the pad or gasket slides on the surface of the stem and becomes affixed to the side thereof with the result that the mechanical strength of the seal or joint is seriously weakened. Like improper emplacement may also occur in the case of the gasket normally located within the base of the cap and the end surface of the insulator cylinder.

It is the chief purpose of the invention to provide a method by which the aforesaid drawbacks are overcome and eliminated.

Another object is to provide a method by which the gaskets or pads are formed in situ and become fixedly and properly attached immediately after formation.

Yet another object is to provide a method by which it is assured that each gasket or pad is centered and emplaced with a high degree of accuracy.

Ancillary to the immediately foregoing object it is a further object to provide an insulator which by reason of precise, accurate and reliable locating and emplacement of the gaskets, has a maximum high resistance, quality, strength and reliability in service.

Still another object is to provide a method which by reason of its possibilities of complete automation, makes possible rapid and reliable production line procedures, reduces costs per unit insulator, and results in an over-all satisfactory product.

Other objects and advantages of the invention will become clear to those skilled in the art, after a study of the following detailed description, in connection with the accompanying drawing.

Advantageously, fibers of mica, for example, are aligned and oriented by the lines of force of an electrostatic field and become affixed like the bristles of a brush, to a coating of wet varnish previously spread over the surface where the gasket or pad is to be formed.

In the drawing:

FIGURE 2 shows schematically the sequence of steps by which a pad or gasket is formed upon the base surface of the stem or shaft constituting a part of the assembly;

FIGURE 3 shows schematically the sequence of steps by which an annular gasket is formed upon the rim of the base of the cap;

Figure 1:
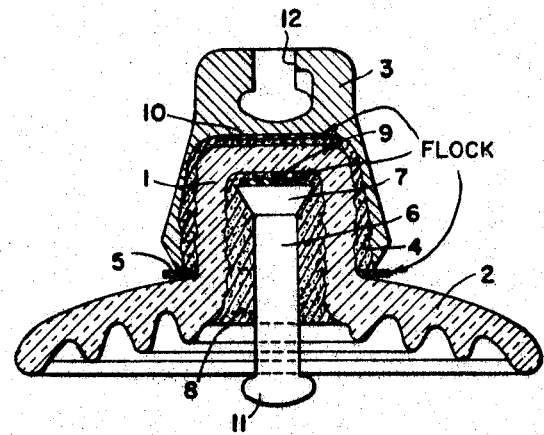
FIGURE 1 is an axial section of the assembled and completed insulator.

Referring to FIGURE 1, the assembled insulator comprises a hollow cylinder 1 of insulating material such as glass or ceramics having a skirt 2 formed integrally with and flaring outwardly from its lower portion. A metallic cap 3 fits down over the cylinder and is secured thereto by cement 4. An annular ring or gasket 5 is interposed between the rim of the cap and the subjacent area of skirt 2, at the location where it merges into the cylinder.

A stem 6 has an integral frusto-conical enlargement 7 at its upper end. This stem is affixed by cement 8 axially within cylinder 1, and a pad or gasket 9 is interposed between the contiguous generally flat surfaces of the interior of the base of the cylinder and the base of enlargement 7. A pad or gasket 10 is interposed between the interfaces of the cap and cylinder. Stem 6 has a bulbous enlargement 11 at its lower end which is constructed, shaped and arranged to fit and be secured within an opening 12 in the upper end of the cap of the insulator assembly next below, not shown.

FIGURE 2 shows the sequence of steps forming a pad or gasket in situ, upon the plane surface of the frusto-conical enlargement 7 of stem 6. A conveyor schematically identified at 13, such as an endless chain, moves from right to left as indicated by the arrow, and at regularly spaced intervals therealong, supports pairs of stems 6 which, as shown, are in inverted positions and supported by their bulbous ends 11 at the respective ends of bars 14. Each bar is fixed to the lower end of a respective one of a plurality of rods 15 each connected at its upper end with conveyor 13, in uniformly-spaced relation therealong. At, or just prior to arrival at station A, an adhesive coating 16, such as polyurethane, is applied to the downwardly-facing surfaces of the frusto-conical ends of the stems at that station.

As each pair of stems move into station B, they pass into an electrostatic field induced between an upper metallic screen or grill 17 and a lower parallel metal plate 18, by a generator, not shown. The connection of the grill and plate to the generator may be made by a contact 19 and carried by the conveyor at each point where a rod 15 is connected therewith. A second contact 20 is attached to plate 18. If desirable or necessary, contact 19 may also be utilized to energize a time relay opening the circuit of the motor, not shown, driving conveyor 13, so that the articles at stations A, B, C, etc., are stopped for a short interval of time, after which the relay operates to re-start the conveyor motor. The same motor may also drive conveyor 27, subsequently described, in timed relation with conveyor 13.

Short fibers of mica, for example, indicated at 21, are fed onto plate 18 and by means not shown, uniformly distributed thereover. The distribution may be effected manually or by means of a shaker which is periodically passed over the plate and simultaneously vibrated to produce a dusting of the plate with the fibers.

The continuous field thus created between plate 18 and screen 17, causes the fibers to be negatively charged, for example, by the plate and to become erect and move along the lines of force toward screen or grill 17. On contact with the grill the fibers lose their negative charge and become positively charged so that some of them drop back onto the plate. But as the result of the interstices of grill 13 and the velocity with which they are projected toward the grill, most of the fibers pass through and impinge upon the flat base of the stem where they penetrate the adhesive previously applied thereto and are thereby uniformly distributed over and attached to the stem to form a gasket or pad. The remaining fibers, that is, those not thus attached, fall back upon grill 17 and ultimately pass downwardly onto plate 18.

At station C the adhesive previously mentioned, covering the flat surface of the stems, is hardened or set by the application of heat which may be produced, for example, by an electric heater 22. The mica fibers are thus firmly attached to the surface of the stem and form thereover a gasket of uniform thickness.

At station D there is a vertically disposed cylinder 23 supplied with pressure fluid from a source not shown. The piston 24 has a rod 25 which projects upwardly through a gland in the end of the cylinder and at its top end supports a container 26 for a bath of varnish 27. As each pair of stems 6 comes to rest over the container, a contact not shown, carried by the conveyor chain, momentarily engages a fixed contact, closes a circuit and opens an electromagnetic valve connecting cylinder 23 with a source of pressure fluid. Container 26 is thus elevated until the lower ends of the stems dip into the varnish and are thereby coated. Following this the pair of stems just coated are transposed leftwardly with the conveyor to a station not shown, where they are assembled into an insulator unit or combination, as depicted upon FIGURE 1.

FIGURE 3 shows the several steps in forming and affixing a gasket-like ring or annulus of mica fibers to the base rim of cap 3. This ring replaces the rubber gasket previously affixed to the rim by adhesive, as has been described.

Some of the disadvantages and drawbacks of prior art procedure have been mentioned. Another one is that this rubber gasket previously used, may slip from its desired position about the rim of the cap, and become displaced so that it is finally located between the side wall of the cap and the cylindrical wall of the insulator, where it not only fails of its intended purpose but also seriously detracts from the strength of the cement connection between the parts.

The steps schematically depicted upon FIGURE 3 are, in general, analogous to those previously described in connection with FIGURE 2. The caps 3 are supported from conveyor 27 by rods 28 which have their upper ends attached to the conveyor, and at their lower ends are provided with bulbous enlargements releasably fitting respective cavities 12 in the caps. The spacing of these rods along the conveyor is uniform and preferably the same as the spacing of rods 15 on and along conveyor 13.

On arrival at station E, or just prior thereto, the rim 29 of each cap is coated in succession with an adhesive indicated at 30. As each cap advances with movement of the conveyor, it moves to station F where a contact 31 on the conveyor or rod 28, closes a circuit to establish an electrostatic field by means of a generator not shown, but which may be the same generator as the one producing the field between plate 18 and grill 17, FIGURE 2. As in the case of station B, FIGURE 2, the field extends between a metal plate 32 connected with the generator 33, and a screen or grill 34 whose meshes are about 1 cm. on a side and which is held at a positive potential, for example, with respect to plate 32. The separation between the grill and plate may be about 15 cm. As with plate 18 previously described, plate 32 is supplied manually or automatically, with an even distribution of short fibers 35. The fibers are erected and impelled upwardly by the electrostatic field, pass through the interstices in screen 34, and impinge upon cap 3. Those fibers which strike the adhesive coating of rim 29 adhere thereto and form an incipient gasket.

As each cap with its adherent fibers arrives at station G, it passes over a heater 36 by which the adhesive is hardened to firmly affix the fibers to the rim of the cap.

At station H each cap passes over a nozzle 37 which directs a jet of air 38 upwardly into the cavity of, and over and about the cap, to thus blow away fibers which have lodged in the cavity or on the outer walls thereof.

At station I an apparatus generally identified at 39, and which is preferably electrostatic in nature, effects a spray of varnish 40 which coats the interior of the cap.

Figure 4:
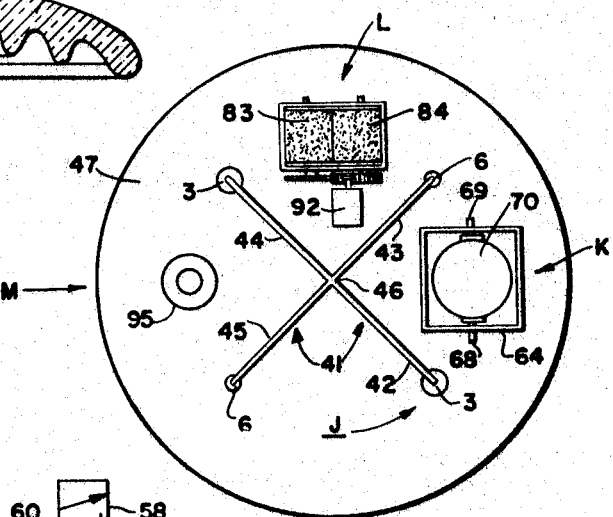
FIGURE 4 is a plan view of an apparatus for carrying out the steps schematically depicted upon FIGURES 2 and 3.

The showing of FIGURES 2 and 3 is schematic but serves to explain the sequence of steps of the method. FIGURE 4 shows in plan an apparatus by which the caps and stems are alternately and successively treated as and for the purposes described in connection with FIGURES 2 and 3.

A rotor element generally identified at 41, consists of four equiangularly-spaced arms 42, 43, 44 and 45 extending in essentially coplanar relation from a common central vertical axis of rotation 46. Each of arms 42 and 44 removably supports a cap 3 at its distal end. Similarly, each arm 43, 45, removably supports a stem 6 at its distal end. Rotor element 41 rotates in the countercolckwise direction as indicated by the arrow, over a fixed platform or base 47. This base carries the items subsequently described. The rotor is turned in steps of 90° each, by means, not shown, and which effects a pause or dwell after each rotational step.

At a work station generally identified at J the treated cap or stem then at that station, is removed from its arm and an untreated item or element, that is, a cap or stem as the case may be, is mounted to the arm. At station K the item carried by the arm at that station, is coated with adhesive. That is to say, in the case of caps 3, the lower rim thereof is coated, while in the case of stems 6 the flat end of the frusto-conical enlargement is coated. At station L, fibers are applied to the coated surface of the cap or stem there located, and at station M, excess fibers adhering to the uncoated areas of the item then at that station, are removed. It will be understood that upon FIGURE 4 the arms 42, 43, etc. are shown at 45° from their normal positions, in order to avoid obscuration of details of the apparatus at the respective stations, and that in practice these arms are stopped only in positions over work stations J, K, L and M.

Figure 5:
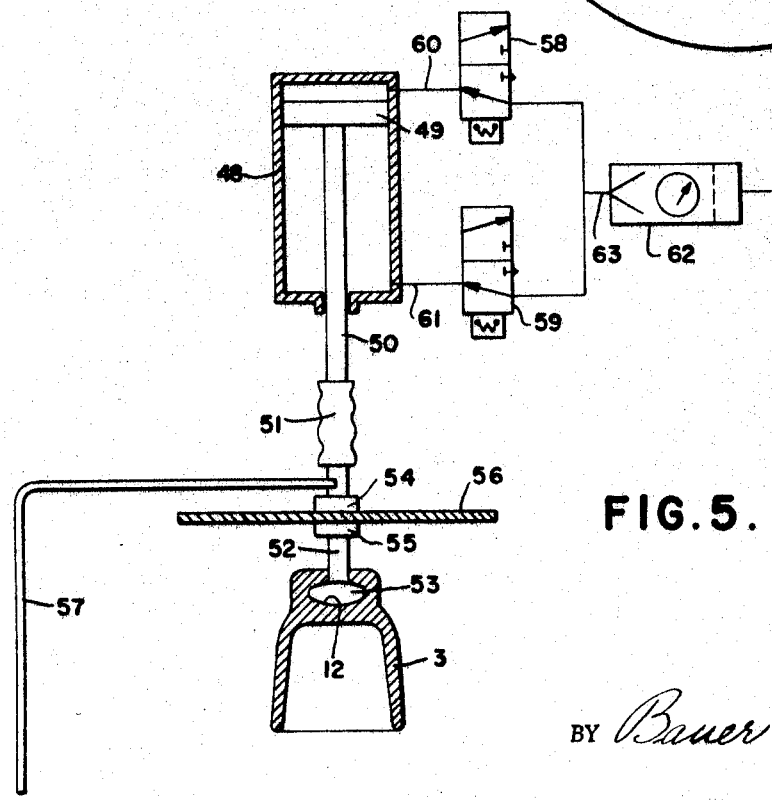
FIGURE 5 is an elevational view, partly in section, of the means by which each cap is supported for controlled vertical movement at the several work stations.

FIGURE 5 shows details of the means for supporting and vertically moving the caps. A pressure fluid cylinder carried, for example, at the distal end of arm 42, has a piston 49 therein. A rod 50 fixed at its upper end to the piston, has an electrically insulating separator or insert 51 attached to its lower end. A support rod 52 which is the functional equivalent of rod 28, FIGURE 3, forms a continuation of rod 50 and has its upper end attached to separator 51. The lower bulbous end 53 detachably secured to the lower end of rod 52, fits cavity 12 of cap 3 to detachably support the cap thereon. Rod 52 has a pair of collars 54, 55 fixed thereto for locating a disk 56 between them. The collars are adjustable on and along the rod so that a corresponding adjustment of the disk may be effected. An L-shaped contact arm 57 has one end fixed to rod 52 above collar 54. The other end is located in a plane normal to the axis of rod 52, somewhat below the level of the rim of cap 3.

Cylinder 48 is double acting. Flow of fluid, such as air, to the upper end of the cylinder is controlled by an electromagnetic valve 58 through pipe 60. Likewise, flow of fluid to the lower end is controlled by electromagnetic valve 59, through pipe 61. These valves may be of a known piston type. A controller 62 is rotated by a motor, not shown, at the desired time rate of a cycle of operation. This cycle is the time required for any one arm, such as 42, to make a complete 360° rotation. The controller effects the necessary sequence of operations for each cycle and thus operates, inter alia, to close the circuit of valves 58, 59, as each arm moves into position at station K and to maintain the circuit for a predetermined interval of time, after which it operates to open the circuit. Thus, for example, controller 62 will be rotated once for each full 360° rotation of rotor 41 and will close the circuit of valves 58, 59 four times at uniformly-spaced time intervals for each rotation. Aternatively, of course, it may rotate four times for each full cycle and close the circuit of the valves once for each rotation. In both cases the circuit will be maintained for a predetermined relatively short time only. Due to piston rod 50 the effective area of the top face of the piston is greater than the corresponding area of the bottom face thereof, so that when both valves are opened the piston is forced downwardly and carries cap 3 with it.

Figure 6:
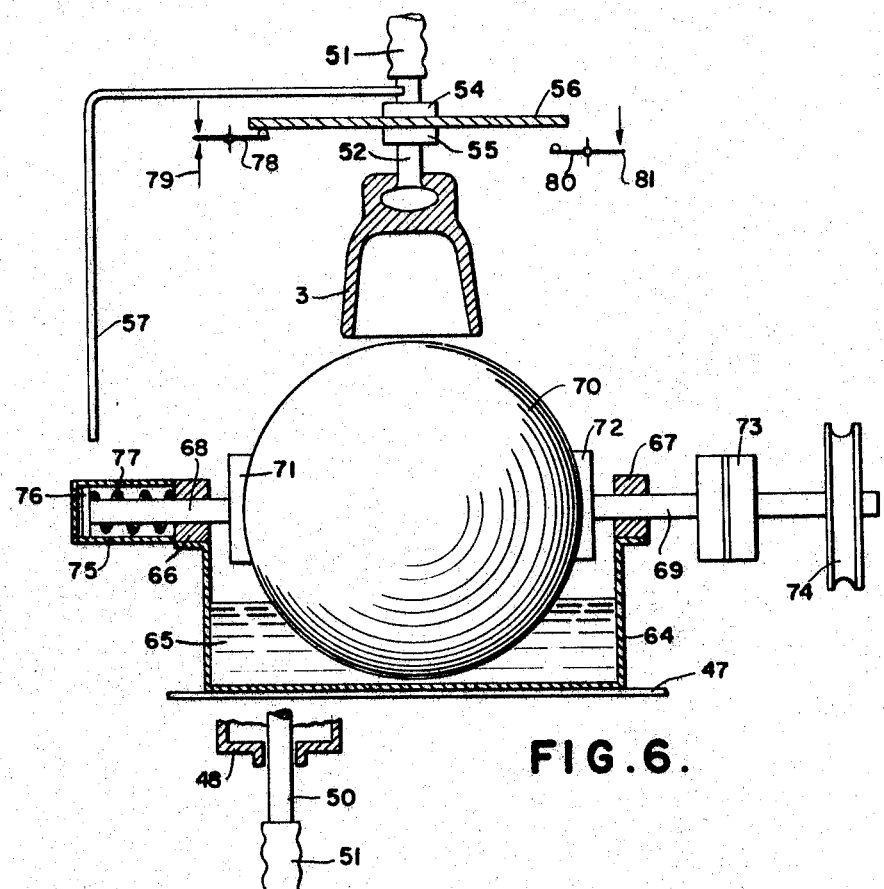
FIGURE 6 is a view showing one cap at a work station where its rim is coated with adhesive.

Referring to FIGURE 6, one of the caps 3 mounted upon the end of arms 42 or 44, is shown at station K, FIGURE 4. A container 64 mounted on base 47 contains a bath of adhesive 65. The container supports horizontally aligned bearings at diametrically-opposite locations as indicated at 66, 67. These bearings journal between them a flexible inflatable sphere 70 of rubber or the like, by means of trunnions or shafts 68, 69 whose inner ends bear cages 71, 72 secured to and supporting the sphere between them at diametrically opposite points. Shaft 69 includes an electromagnetic clutch 73. A pulley 74 is secured to the outer end of this shaft and is driven from a source of power, not shown, at a slow rate so that when clutch 73 is energized, sphere 70 is correspondingly turned. A cylinder 75 fixed with container 64 is mounted coaxially about the outer end of shaft 68. The shaft carries an abutment 76 attached to its end, and a coil spring 77 about the shaft acts on the abutment to urge the shaft, sphere ,etc., to the left as viewed upon FIGURE 6, to thus urge the two halves of clutch 73 out of engagement when the latter is de-energized. Thus, with the clutch energized, sphere 70 is slowly rotated so that its surface is continuously wetted with adhesive.

A switch arm 78 pivoted between its ends, has a contact 79 in the circuit of the electromagnet of clutch 73. The arm is so positioned that when cap 3, as it is lowered by piston 49, approaches contact with sphere 70, the arm is engaged by disk 56 and the clutch is de-energized to thus stop rotation of the sphere. Then on further descent of the cap its rim contacts the sphere and acquires a coating of the adhesive. At this instant, disk 56 engages a second switch arm 80 having a contact 81 which is in circuit with the solenoid of valve 58. On de-energiaztion, valve 58 is spring-operated to connect the top end of cylinder 48 with atmosphere so that as a result, pressure still effective through pipe 61, elevates the cap out of contact with the sphere. As soon as disk 56 moves upwardly beyond the position shown at FIGURE 6, contact is closed at 79, clutch 73 is again energized and rotation of sphere 70 is resumed.

Figure 7:
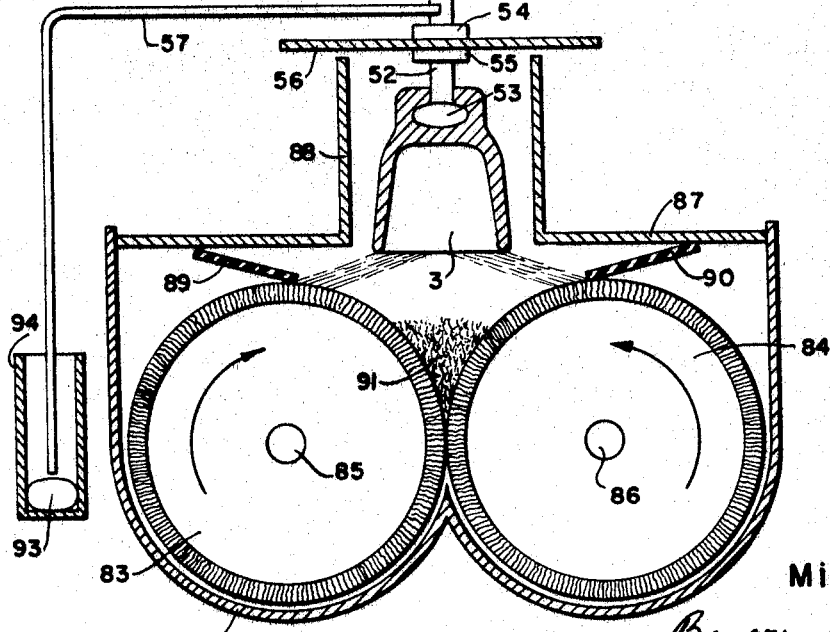
FIGURE 7 is an elevational view, partly in section, of means by which flocking or fibers are applied to the adhesive-coated areas of caps and insulator elements.

Turning to FIGURE 7, there is shown mechanism at station L, FIGURE 4, by which flocking or fibers are applied to the adhesive-coated areas of the cap or insulator then positioned at that station. Since cylinder 48, rod 50, separator 51, disk 56, etc. have been previously described, it is not necessary to repeat. The container for fibers 82 is shaped generally to conform to the lower halves of two contiguous cylindrical brushes 83, 84, journaled in the container on horizontal, horizontally-spaced axes 85, 86, respectively. The shafts of the brushes are geared together externally of the casing, as shown upon FIGURE 4, and one of the gears is in mesh with a pinion on the shaft of motor 92. Thus, as indicated by the arrows of FIGURE 7, the brushes are rotated equally and oppositely.

The container includes a cover 87 secured thereto and having a central opening from which an upstanding sleeve 88 extends. The cover and sleeve are of insulating material such as plastic. This sleeve is sized to freely accommodate cap 3 as the latter descends thereinto under control of pressure fluid in cylinder 48, and is so dimensioned that when a cap 3 is properly located over and centrally between the brushes, disk 56 rests upon and seals the upper end of the sleeve. Cover 87 supports a pair of rectangular rubber sheets 89, 90. For example, sheet 89 is fixed along one edge thereof to cover 87 and is held and so dimensioned that it extends generaly tangential to brush 83 at its top, and with its opposite edge in contact with the bristles of the brush. Sheet 90 is similarly and allochirally related with respect to brush 84.

Thus as the brushes rotate their bristles are flexed oppositely to their directions of rotation as they contact the respective sheets. As the deflected bristles pass out of contact with the sheets they snap forwardly and project a steady stream of entrained fibers onto the adhesive coated surface of the cap or stem then at that station. As indicated at 91 a supply of fibers is continuously fed into container 82 so that the brushes are maintained impregnated therewith.

It will be understood that as each arm 42, etc., bearing a cap or a stem, as the case may be, is indexed to position with its distal end over sleeve 88 at station L, a cricuit is closed introducing pressure fluid into the cylinder at that station, to thus effect lowering of the element into approximately the position shown upon FIGURE 7. The control mechanism for doing this includes a switch lever and contacts such as 80, 81 described in connection with FIGURE 6. However, in place of contact means 78, 79, FIGURE 6, a control circuit for motor 92 driving brushes 83, 84, includes a mercury globule 93 within capsule 94. This capsule is so constructed and adjustably fixed that when cap 3 is lowered to proper position with respect to the brushes, the end of contact arm 57 touches the mercury and closes a circuit to energize motor 92. The motor then rotates the brushes the spray fibers onto the adhesive-coated surface of the cap or stem, as the case may be. A predetermined time later coordinated with or determined by controller 62, the motor circuit is opened, as by a time relay, until valve 58 has been actuated to connect pipe 60 with exhaust and contact 57 has been elevated free of merucry 93. Contact between 57 and the mercury is also utilized to energize an electrostatic generator, not shown, but which acts to induce a field at the cap or stem, aligning the fibers as they adhere thereto.

Figure 8:
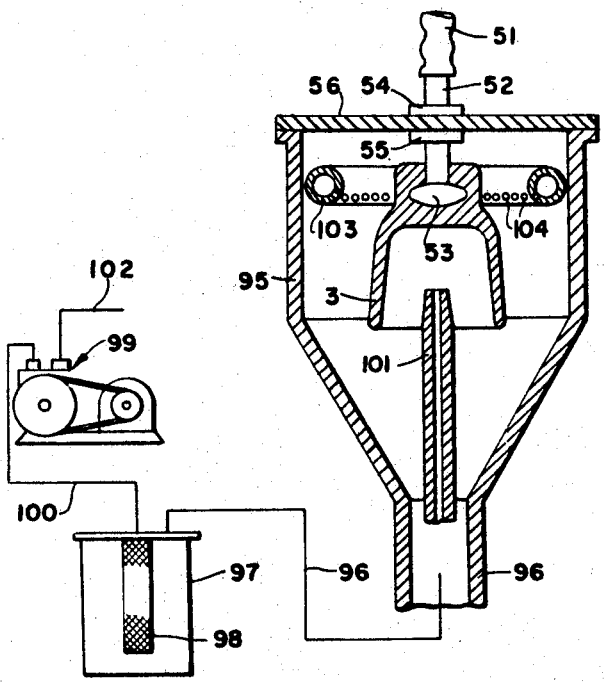
FIGURE 8 is a vertical axial sectional view of the mechanism by which excess fibers adhering to the uncoated areas of the item then at that station, are removed and collected for re-use.

FIGURE 8 shows the mechanism located at station M, FIGURE 4, where excess fibers adhering to the cap or stem are removed and collected for re-use. An enclosure 95 generally cylindrical in form, has a frusto-conical base continuing downwardly in an exhaust conduit 96 extending to a suction chamber 97. This chamber contains a filter element 98 through which air is exhausted as it passes from the enclosure to a motor-driven pump 99, through intake pipe 100.

A nozzle 101 extends upwardly and centrally within enclosure 95 and is connected with the output pipe of pump 99, as indicated at 102. This output pipe is also connected with a hollow torus 103 having a circular ring of apertures 104, and fixed within the enclosure, as shown.

As a cap 3, for example, arrives over enclosure 95 at station M, valves 58, 59 are actuated in the manner described in connection with FIGURE 5, to cause lowering of the cap until disk 56 rests upon the rim of the enclosure. At this point arm 57 closes a contact starting the motor driving pump 99. Air is then forced through nozzle 101 blowing excess fibers from the interior of the cap. Simultaneously, air is blown through apertures 104 thus removing fibers adhering to the exterior of the cap. These excess fibers are drawn through pipe 96 and retained by filter 98 in chamber 97 where they are periodically collected for re-use in container 82. After a predetermined time a time-controlled relay opens the circuit of the pump motor, and as valve 58 is de-energized to open cylinder 48 to exhaust, the cap is elevated out of the enclosure and the rotor indexed one step until the cap arrives at station J where it is removed and transferred to a drier or oven for hardening of the adhesive, and another cap is mounted on the arm for treatment. It will be understood that all time functions may be under control of controller 62, FIGURE 5, so that all times of operation such as rotation of brushes 83, 84, and operation of pump 99 are properly correlated.

Figure 9:
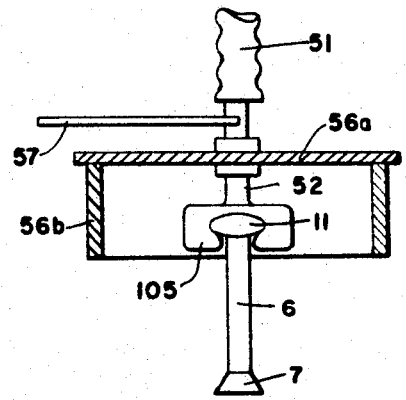
FIGURE 9 is a detail view showing how the stems are supported during treatment.

It has been previously explained that, referring to FIGURE 4, arms 42 and 44 support caps 3 at their distal ends while alternate arms 43, 45 support stems 6. FIGURE 9 shows the construction at the distal end of each of arms 44, 45, FIGURE 4. Since insulating separator 51, rod 52 and contact arm 57 may be duplicates of those described in connection with FIGURE 5, they have been identified by the same reference numerals. However, instead of the bulbous enlargement 53, rod 52 carries a socketed element 105 detachably secured to its lower end to receive and detachably support the bulbous end 11 of stem 6. Also disk 56a has a cylindrical skirt 56b depending therefrom coaxially with support rod 52, for a purpose subsequently explained. Thus as each arm 43 or 45 is indexed into station J, FIGURE 4, a treated stem is removed from its socket for transfer to a drying means, and an untreated stem is mounted as shown, FIGURE 9.

As each stem is indexed in station K and lowered by the timed introduction of air under pressure into its cylinder 48, its lower end contacts sphere 70 which, in the manner previously explained, is now motionless, and receives a coating of adhesive. At station L the brushes 83, 84 dust the adhesive-coated surface with fibers 91, and at station M the excess fibers adhering to the stem are removed and recovered, as previously explained in connection with FIGURE 8.

Figure 10:
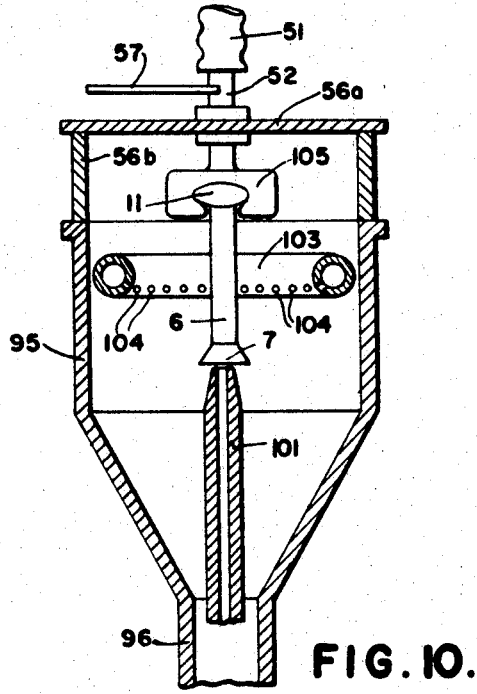
FIGURE 10 is an axial sectional view of the construction by which excess fibers adhering to each stem, are blown therefrom.

Referring to FIGURE 10, one stem 6 is shown at station M. Skirt 56b of disk 56a is for the purpose of compensating for the greater over-all vertical dimension of the stems, and has a width such that when its lower rim contacts the rim of enclosure 95, it makes a dust-tight seal therewith and the adhesively-coated surface of the end 7 of stem 6, lies just above nozzle 101. Thus, in the manner previously described in connection with FIGURE 8, when the parts are in the position shown upon FIGURE 10, air jets from nozzle 101 and apertures 104 blow away excess fibers adhering to the surfaces not coated with adhesive. These fibers are drawn into chamber 97 and collected for re-use.

Figure 11:
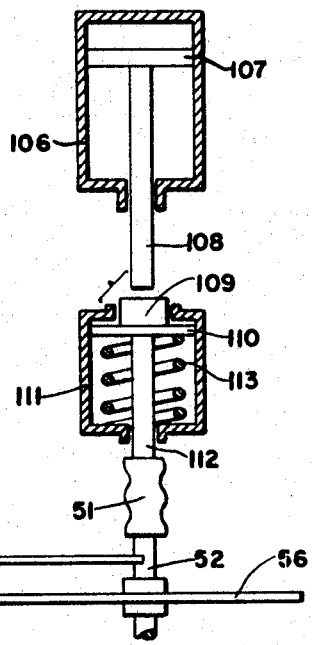
FIGURE 11 is a detail view of a modification of means for processing the caps and stems prior to assembly.

FIGURE 11 shows a modification wherein the pressure fluid cylinders are stationary, one at each of the stations K, L, and M, and thus do not rotate as a unit with rotor 41. The fluid pressure cylinder 106 is one of three. Piston 107 therein has a rod 108 which terminates at its lower end in alignment with a tappet 109 fixed with a plunger 110 slidably fitting a cylinder or guide 111. A rod 112 corresponding in function with rod 50, FIGURE 5, has one of the electrically insulating separators 51 secured to its lower end and which, in turn, carries a rod 52 and disk 56 as described in connection with FIGURE 5. Likewise, contact arm 57 may be a duplicate of the one shown at FIGURE 5.

A compression coil spring 113 within cylinder 111 abuts at its upper end against plunger 110 and at its lower end against the base of the cylinder, and thus acts to urge rod 112 and parts attached thereto into the position shown. There will be one of these assemblies of cylinder 111, rods 112, 52, etc. secured to the end of each of the arms 42, 43, 44 and 45. The indexing mechanism which determines the four 90° positions of rotor 41, is so adjusted that when any arm is in its indexed position at one of the stations K, L or M, its tappet 109 is aligned with the rod 108 at that station and slightly spaced therebelow. When controller 62, FIGURE 5, energizes valves 58, 59 to admit air under pressure to cylinder 106, rod 108 is thereby forced downwardly against the urge of spring 113, to correspondingly move rod 52, disk 56 as and for the purpose previously described. Since each of these three cylinders is fixed, the construction shown upon FIGURE 11 does not require any slip-joint or rotary couplings in the air pressure lines.

While I have disclosed the preferred form of the apparatus for carrying out the method, numerous changes, substitutions of equivalents, parts and materials, and modifications, will readily occur to those skilled in the art, after a study of the foregoing description. Hence the disclosure should be taken in an illustrative rather than a limiting sense. All changes and modifications within the scope of the subjoined claims, are reserved.

Having fully disclosed the invention, what I claim and desire to secure by Letters Patent is:

1. In an electric insulator, a tubular cylinder of dielectric material, having a longitudinal axis of symmetry and having its first end closed, a metal cap having a central axis of symmetry and sized to fit loosely over and about said first end of said cylinder, said cylinder and cap having conforming end interfaces, cementitious material rigidly interposed between and uniting the cylindrical surface of said cylinder with said cap, with said axes coincident, and with said interfaces contiguous, and a layer of flock comprising electrostatically applied parallel fibers of dielectric material uniformly distributed over and attached to one said interface normal thereto and forming a gasket in surface contact with the other said interface.

2. The insulator of claim 1, the second end of said cylinder being open, an elongated metal stem having a flat end and a longitudinal axis, cementitious material rigidly uniting said stem to and within said cylinder through the open end thereof, with the axes of said stem and cylinder in coincidence, said flat end and the closed end of said cylinder in coincidence, said flat end an the closed end of said cylinder being contiguous, and forming interfaces, and flock comprising electrostatically applied parallel fibers of dielectric material uniformly distributed over and attached to said flat end and forming a second gasket separating the interfaces of said stem and cylinder.

3. The insulator of claim 2, the second end of said cylinder being flared outwardly to form a skirt, said cap having a rim closed adjacent said skirt at the junction thereof with the cylindrical wall, and a gasket of flock comprising electrostatically applied parallel fibers of dielectric material uniformly distributed over and secured to said rim and separating the same from said skirt at its interface with said rim.

4. The insulator of claim 3, said flock being selected from the group consisting of fibers of glass, mica, and nylon.

5. The insulator of claim 3, said flock being in the form of short fibers selected from the group consisting of mica and glass and disposed substantially normal to the interface to which they are attached and contact.

6. The method of assembling an electrical insulator comprising a tubular element of dielectric material having a closed end one surface of which forms an interface, with a metallic cap element adapted to be secured to said tubular element in interfitting relation, with a surface thereof forming a second interface, said method comprising, coating one said interface with adhesive, electrostatically projecting fibers of dielectric material onto and uniformly over said adhesive-coated interface, drying said adhesive to secure said fibers in the form of a gasket over said one interface, assembling said elements into interfitting relation, with said gasket in surface contact with the other said interface, and filling the interspace between said elements with hardenable material.

7. The method of forming in situ a cushion and seal, upon a first interface of a component part of an electrical insulator to be assembled permanently into contact with a second interface of another component part thereof, comprising, coating said first interface with adhesive, electrostatically projecting fibers selected from the group consisting of glass and mica, into contact with the adhesive of the coated interface, to thereby embed one end of each fiber in the adhesive, substantially normal to said first interface, drying the adhesive, assembling the parts with the first and second interfaces in contiguous superposed relation, and permanently securing the parts together in said relation.

References Cited
UNITED STATES PATENTS

| | | | |
|---|---|---|---|
| 141,330 | 7/1873 | Crittenden | 117—33 |
| 271,201 | 1/1883 | Knoepplin | 117—25 |
| 286,039 | 10/1883 | Mayall | 117—33 |
| 1,281,268 | 10/1918 | Austin | 174—182 |
| 1,284,975 | 11/1918 | Austin | 174—182 X |
| 1,284,976 | 11/1918 | Austin | 174—182 |
| 1,994,293 | 3/1935 | Taylor | 174—189 X |
| 2,010,934 | 8/1935 | Smith | 264—262 X |
| 2,223,476 | 12/1940 | Amstuz | 117—17.5 |
| 2,383,090 | 8/1945 | Torok | 174—182 |

FOREIGN PATENTS 767,963   2/1957   Great Britain.

LARAMIE E. ASKIN, *Primary Examiner.*